Oct. 8, 1935.   W. L. BELKNAP   2,016,795
DEVICE FOR FLARING PIPE
Filed May 17, 1935
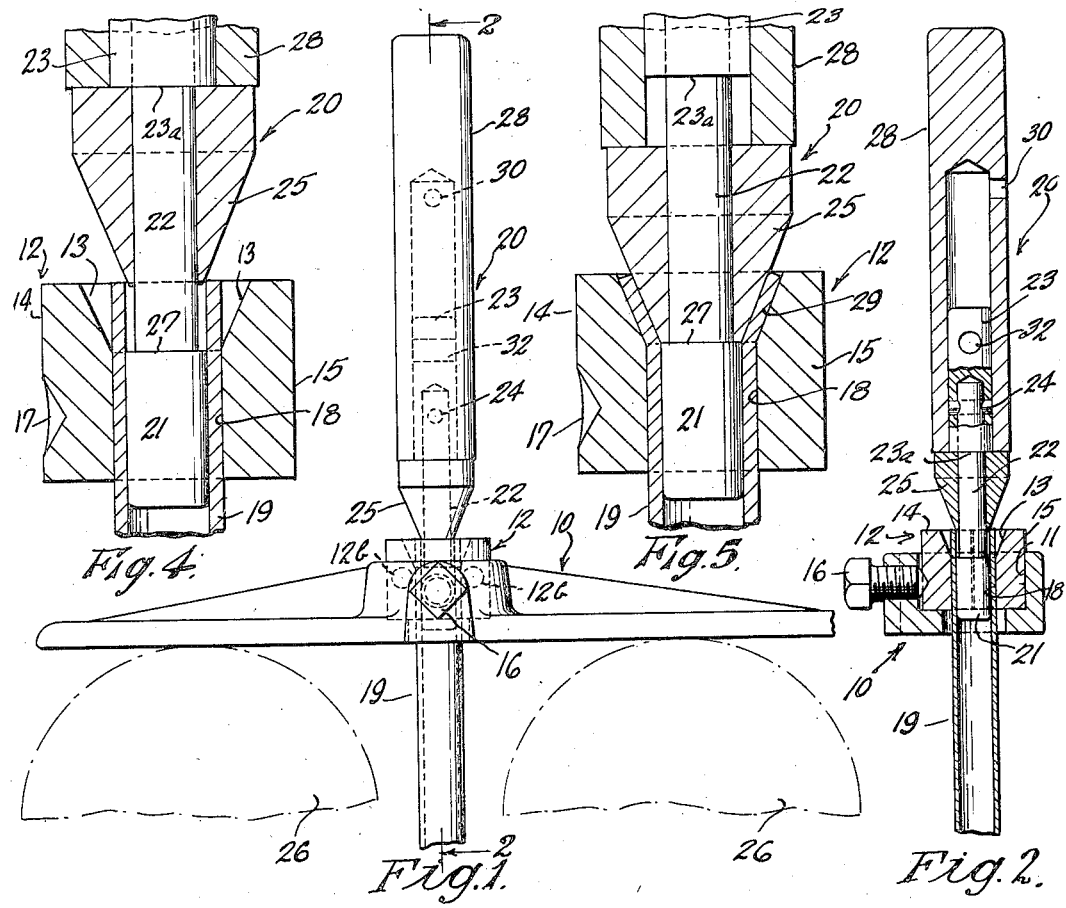
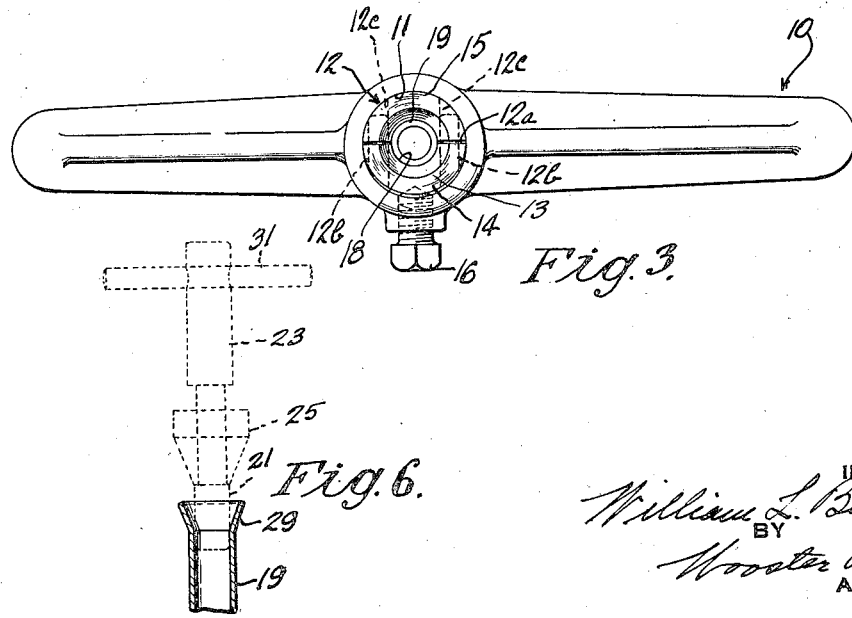
INVENTOR
William L. Belknap
BY
Wooster & Davis
ATTORNEYS.

Patented Oct. 8, 1935

2,016,795

UNITED STATES PATENT OFFICE 2,016,795

DEVICE FOR FLARING PIPE

William L. Belknap, Stratford, Conn.

Application May 17, 1935, Serial No. 21,918

10 Claims. (Cl. 153—79)

This invention relates to new and useful improvements in a device for flaring pipe, and has particular relation to a device for flaring the ends of copper pipe or tubing preparatory to making a joint with another pipe or a fixture.

An object of the invention is to provide a device of the kind indicated and which can be used by a workman on the job and which gives a perfect flare and does not score the surface of the pipe.

Other objects and advantages will become apparent from a consideration of the following detailed description taken in connection with the accompanying drawing wherein a satisfactory embodiment of the invention is shown. However, it will be understood that the invention is not limited to the details disclosed but includes all such variations and modifications as fall within the spirit of the invention and the scope of the appended claims.

In the drawing:

Fig. 1 is a front elevational view showing the device in use;

Fig. 2 is a vertical central sectional view taken substantially along the line 2—2 of Fig. 1;

Fig. 3 is a top plan view of the die support and showing the die in place therein;

Fig. 4 is a detail sectional view on an enlarged scale showing the parts ready for the flaring of the pipe;

Fig. 5 is a similar view but showing the parts in the positions occupied by them at the end of the pipe flaring operation; and Fig. 6 is a sectional view through the flared end of a pipe and by dotted lines shows the manner of removing the device from the pipe.

Referring in detail to the drawing, the device as shown includes an elongated support 10 provided approximately midway its length with a die receiving recess 11 in which is located a split and dowelled die 12 flared at its upper end as at 13 and comprising sections 14 and 15. A set screw 16 is passed through a wall of the recess 11 and has its inner end engaged in a notch 17 in the die section 14, and it will be apparent that on tightening such screw the die section 14 will be forced toward the die section 15. When together the die sections provide an opening 18 of a diameter substantially the same as or slightly less than the outside diameter of the pipe to be flared and the flare 13 of the die corresponds to the flare desired on the pipe. The die sections are so formed as to be slightly spaced as shown at 12a after being placed against the side of the pipe so that when the set screw is tightened the die sections are clamped tightly against the pipe. Dowel pins 12b on one die section extend into openings 12c in the other section to keep them in alignment.

A pipe to be flared is shown at 19, and the end of the pipe is inserted in the die 12 with its upper end even with the top of the die after the pilot 21 is inserted as described below. It is then clamped in the support 10 by tightening the set screw 16. Tightening of such screw secures the die in the support 10 and further serves to cause the die to clamp the pipe in place tightly on the pilot 21 which supports the walls of the tube on the inside. When the pipe is clamped in place the flaring tool generally designated 20 is used to spread the upper end of the pipe in the flare 13 of the die and with the tool and die the ends of any number of pipes may be flared uniformly.

Tool 20 includes a pilot 21 of a diameter to have a tight fit in the tube 19, and extending from such pilot is a reduced portion or stem 22 to the outer end of which a head 23 is secured by any suitable means such for example as a pin 24 passing through the head and stem. Slidable on the stem between the head and pilot is a tapered plug 25, and the distance between the head and pilot is equal to the length of said plug plus the length of the flare to be imparted to the end of the pipe 19.

In using the device the pilot 21 is inserted into the end of the pipe until the lower end of the plug engages the end of the pipe and the shoulder 23a is against the top of plug 25, as shown in Figs. 2 and 4. This determines the position of the shoulder 27 and locates it at the proper distance from the free end of the pipe and thus determines the length of the flare to be formed. The pipe with the pilot in it is now located in the die 10 with the free end of the pipe even with the top end of the die as indicated in Figs. 2 and 4. This locates the shoulder 27, or that is the upper end of the pilot 21, at about the bottom of the flare 13 of the die so that the pilot is within that portion of the pipe clamped by the die. The set screw 16 is then tightened, clamping the die sections tightly about the pipe, which is tightly gripped between the die and the pilot 21, this pilot acting to also support the walls of the pipe and prevent their collapsing under the pressure of the die, and thus maintaining the correct diameter of the pipe. Next, a cap 28 is slipped over the head 23 so that its lower end rests on the top of the tapered plug 25. Now, by hammering on the top of the cap 28 the plug 25 is driven into the end of the pipe spreading it outwardly against the sides of the flare 13 of the die thereby imparting to the pipe a flare 29 (see Figs. 5 and 6) corresponding exactly with the flare 13 of the die. It will be understood that the cap 28 has a sliding fit on head 23 so that it is guided by this head, and that hammer blows on the cap are transmitted directly to the plug 25 so that there is no tendency to drive the pilot 21 out of its place. During the hammering operation the die support 10 may rest on any suitable support, such for example as the legs of the operator above the knees, indicated at 26 by the broken lines, and thus the work may be effectively done on the job where the pipe is being installed.

Fig. 4 particularly shows the relationship of the parts just prior to the hammering of the plug into the upper end of the pipe and Fig. 5 shows the positions of the parts after the plug has been hammered into the pipe and the desired flare imparted to the pipe end. 30 is an air escape opening in the cap 28 so that as the latter is hammered down with the plug there is no air cushion between the cap and the head 23. After the plug 25 has been hammered into the pipe end the cap 28 is removed from the head 23, the set screw 16 loosened, and a handle rod 31 (see Fig. 6) may be passed through an opening 32 in the head. By turning such rod and at the same time pulling on it the pilot is pulled from the pipe as indicated in Fig. 6.

From the foregoing it will be seen that by means of the device of the present invention the ends of pipes, usually copper, may be uniformly flared without scoring the outer surfaces of the pipes adjacent the flares, and without otherwise deforming the pipe. This may be accomplished by workmen on the job.

Having thus set forth the nature of my invention, what I claim is:

1. A pipe flaring tool including a stem having at one end a pilot to fit in the end of a pipe immediately inwardly of the portion to be flared, a head on the outer end of said stem, and a tapered plug slidable on the stem between the head and pilot.

2. A pipe flaring tool including a stem having at one end a pilot to fit in the end of a pipe immediately inwardly of the portion to be flared, a head on the outer end of said stem, a tapered plug slidable on the stem between the head and pilot, and said head and pilot having their opposed ends spaced apart a distance equal to the length of said plug plus the length of the pipe portion to be flared.

3. A pipe flaring tool comprising a pilot of a diameter to fit in the end portion of a pipe inwardly of the portion to be flared, a reduced stem extending from said pilot, a head on the outer end of said stem, a tapered plug slidable on the stem between the pilot and head, and said head having an opening therein for the passage of a handle rod to be used in removing the tool from a pipe end.

4. A pipe flaring tool comprising a pilot of a diameter to fit in the end portion of a pipe inwardly of the portion to be flared, a reduced stem extending from said pilot, a tapered plug slidable on said stem and having its end of smaller diameter toward said pilot, and a cap slidable over said stem into engagement with said plug to receive and transmit hammer blows to the plug independent of the pilot and stem.

5. A pipe flaring tool comprising a stem having an enlargement at one end comprising a pilot to fit in the end of a pipe inwardly of the portion to be flared, a head on the outer end of the stem, a tapered plug slidable on said stem between the head and pilot, a cap slidable over said head into engagement with said plug to receive and transmit hammer blows to the plug independent of the pilot and stem, and said head and pilot having their opposed ends spaced apart a distance equal to the length of the plug plus the length of the pipe portions to be flared.

6. In a device for flaring pipe, a support having a die receiving recess, a split die in said recess and having a flare at its upper end, means for causing said die to grip a pipe inwardly of its portion to be flared, a pilot of a diameter to fit in the pipe inwardly of its portion to be flared, a reduced stem extending outwardly from said pilot, a head on said stem, a tapered plug slidable on said stem between the head and pilot, and a cap slidable over the head into engagement with the plug to receive and transmit hammer blows to the plug independent of the stem and pilot to drive the plug into the end of a pipe and spread it into the flare of the die.

7. In a device for flaring pipe, an elongated support having a die receiving recess intermediate its ends, a split die in said recess and having a flare at its outer end, a screw passing through a wall of said recess and engaging said die to retain it in the recess and cause it to clamp a pipe inwardly of its portion in the flare of the die, a pilot of a diameter to fit in the clamped portion of a pipe held by said die, a reduced stem extending outwardly from said pilot, and a tapered plug slidable on said stem and adapted to be driven into the end of a pipe held by said die to spread the end of the pipe into the flare of the die.

8. In a device for flaring pipe, an elongated support having a die receiving recess intermediate its ends, a split die in said recess and having a flare at its outer end, a screw passing through a wall of said recess and engaging said die to retain it in the recess and cause it to clamp a pipe inwardly of its portion in the flare of the die, and a tapered plug adapted to be driven into the end of a pipe held by said die to spread the end of the pipe into the flare of the die.

9. In a device for flaring a pipe end, a pilot including a stem and a portion of a diameter to fit in the end of the pipe, a split die having a tapered recess, means for clamping the die about the pipe at the level of the pilot, a tapered plug slidable on the stem of the pilot, and means for forcing the plug into the end of the pipe to expand it into the recess.

10. In a device for flaring a pipe end, a pilot to fit in the pipe a short distance from its end, a split die to embrace the pipe at the level of the pilot and having a tapered recess outwardly of the pilot, means for clamping the die on the pipe to clamp the pipe on the pilot, a tapered plug for insertion in the end of the pipe, and means for forcing the plug into the pipe to expand the end of the pipe into the recess.

WILLIAM L. BELKNAP.